Feb. 15, 1966     T. T. THOENY     3,235,645
METHOD FOR FORMING THINWALL STRUCTURES
Filed Aug. 25, 1961     2 Sheets-Sheet 1
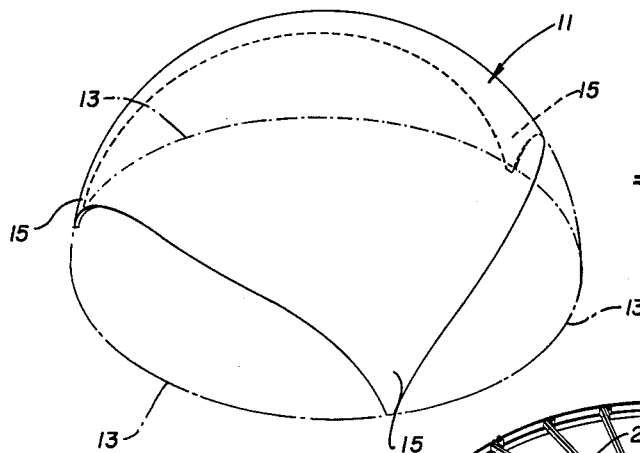
Fig. 1
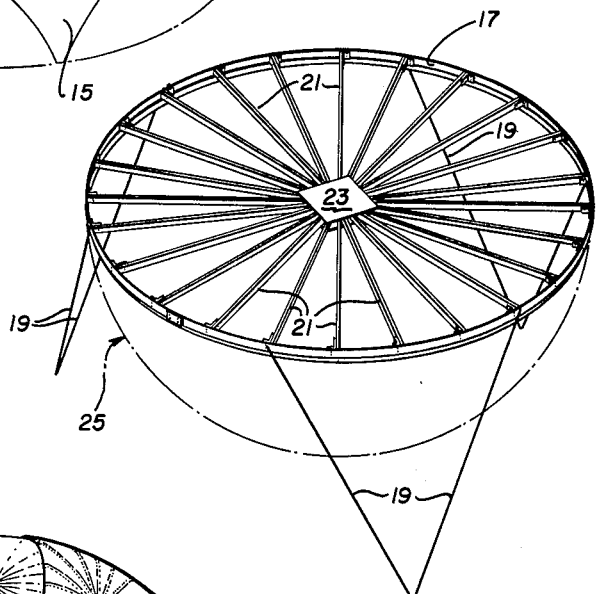
Fig. 2
Fig. 3
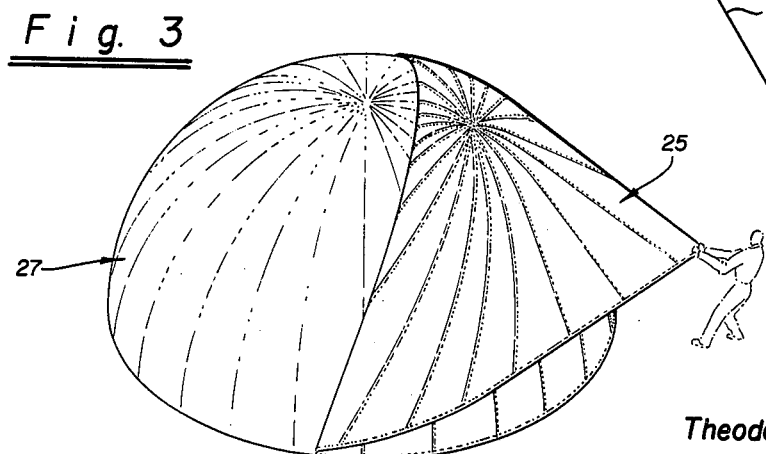
INVENTOR.
Theodore T. Thoeny
BY 
Attorneys ём
United States Patent Office 3,235,645
Patented Feb. 15, 1966

3,235,645
METHOD FOR FORMING THINWALL STRUCTURES
Theodore T. Thoeny, San Jose, Calif.
(2434 Harper St., Santa Cruz, Calif.)
Filed Aug. 25, 1961, Ser. No. 133,892
2 Claims. (Cl. 264—316)

This invention relates to a method for forming thin-wall structures and more particularly to a method for forming varied architectural designs of thinwall material such as fiberglass and the like.

There has been considerable activities in the architectural field in the use of fiberglass and similar materials in structural designs. With fiberglass structures, as well as with other plastic thinwall structures, the primary problem has been in the development of an economical form for the fiberglass and resins while in their plastic state.

One solution to the problem, which is the method most commonly used today, is to grade a mound of dirt into the desired shape and covering the mound with concrete. This method is obviously expensive and is only practical with large structures at ground level.

Another solution to the problem has been the use of flexible material such as rubber impregnated canvas in the form of a balloon. The balloon is predesigned for an inflated shape similar to that of the desired structure. The inflated balloon is coated with a plastic material which is allowed to season.

The major difficulty with the balloon type construction is that the form material must be air tight and, moreover, extensive inflating means are required. In addition, in relying upon the inflated balloon to hold the plastic material, the weight of the plastic material itself often deforms or tends to flatten the balloon whereby design of the final shape is somewhat complicated. A further disadvantage with balloon construction is that the plastic material may be conveniently applied only to the outside whereby the surface texture of the form is always on the inside of the finished structure.

It is, therefore, a general object of this invention to provide an improved method for forming thinwall structures.

It is a more particular object of this invention to provide a method for forming thin wall structures which alleviates the problems involved with inflatable forms.

It is another object of this invention to provide a method of forming thinwall structures which employs a suspended flexible membrane which may be coated with the plastic material on either surface thereof to form a desired structure.

It is still another object of this invention to provide a method of forming thinwall structures having the aforementioned characteristics wherein a flexible membrane is suspended from an elevated peripheral form and wherein a substantially rigid-setting plastic material is applied to a surface of the flexible membrane and allowed to season thereon.

These and other objects and features of the invention will become more clearly apparent on a review of the following description in conjunction with the accompanying drawings, in which:

FIGURE 1 is a perspective view of a finished structure built in accordance with this invention;

FIGURE 2 is a perspective view of a peripheral form with a suspended membrane in accordance with this invention;

FIGURE 3 is a perspective view of an erected or inverted structure constructed in the form of FIGURE 2 with the membrane being stripped from the structure itself;

Figure 4:
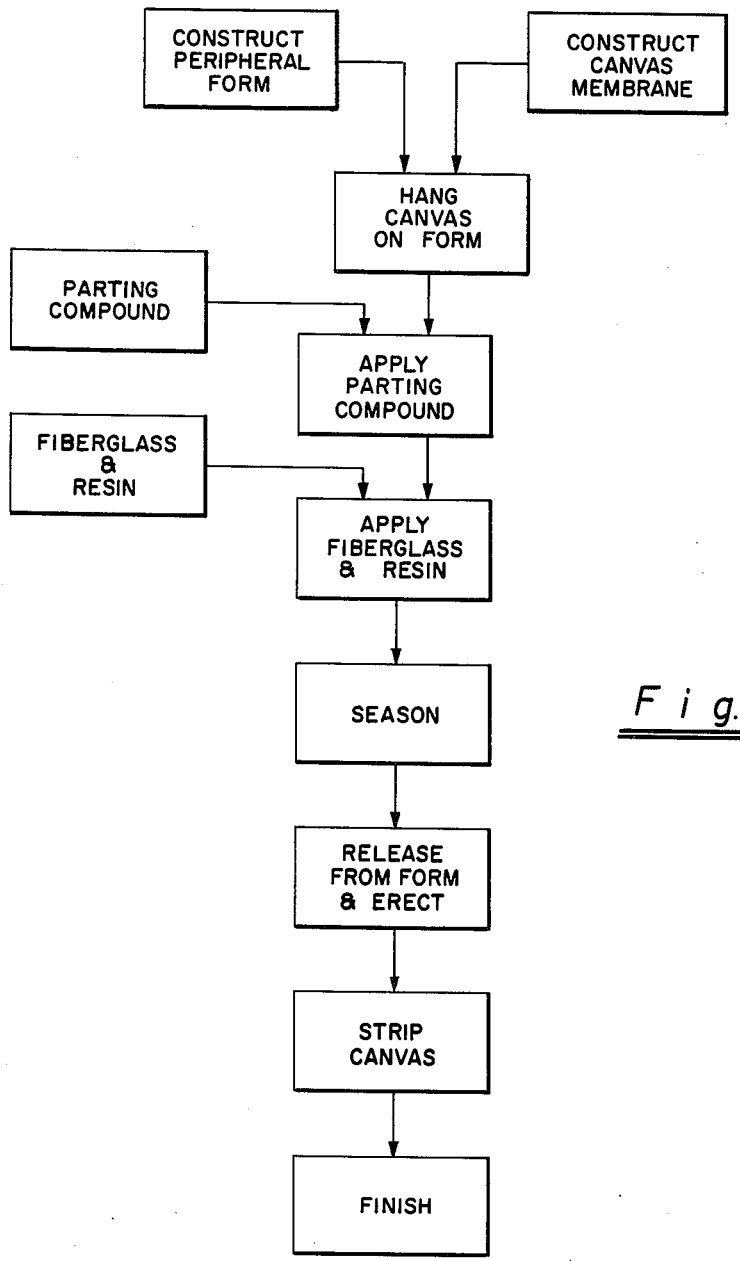
FIGURE 4 is a flow chart of a typical process in accordance with this invention.

Referring to FIGURE 1, a typical structure 11 constructed in accordance with a method of this invention is shown. As can be seen the structure is generally a shell hemispherical in shape but includes cut out areas 13 leaving supports 15 for contact with and to be secured to, the ground. In general, the shell may be constructed in hemispherical form and the areas 13 cut out after the structure is erected.

Alternatively, the areas 13 could be omitted in the actual forming of the shell rather than subsequently cutting out. Thus, the economy would be increased. Also, if the shell is to be used as a form for concrete it could be constructed and retained as a full hemisphere.

Referring to FIGURE 2, a form for the structure of FIGURE 1 is shown. This form includes a rim 17 elevated and supported by upright V-shaped members 19. Radial ribs 21 extend outwardly from a central base 23. The ribs 21 serve to retain the rim 17 in the desired shape as a peripheral form. Alternative to, or in addition to, the ribs 21, guy wires may be used to retain the form in its desired shape.

A flexible membrane 25 which may be of canvas or the like, is suspended from the rim 17 of the peripheral form. The membrane 25 may be coated or impregnated with a wax or some other well known parting material whereby it may be stripped from the structure after seasoning.

With the membrane 25 so suspended from the peripheral form and coated with a parting compound, it may be sprayed with a substantially rigid-setting plastic material such as a combination of fiberglass and resin which is well known for such thinwall structures. The plastic material may be sprayed either on the upper or under side of the membrane 25 depending upon which surface of the finished structure is desired to be smooth. That surface of the finished structure adjacent the membrane 25 will conform to the texture of the membrane itself while the surface remote from the membrane will have a finish determined by the particular material used and its method of application to the membrane. If the plastic material is sprayed onto the membrane 25 it will retain a substantially smooth finished surface.

After the plastic material has been applied to the membrane 25 it is allowed to season, preferably by the mere passage of time. After seasoning, the plastic material as well as the membrane 25 is released from the peripheral form and inverted as shown in FIGURE 3. At this point the membrane 25 may be stripped from the seasoned plastic structure 27. If the plastic material is sprayed on the upper side of the membrane 25 as shown in FIGURE 2 it may be more convenient to remove the membrane from the seasoned structure prior to inverting the same.

Referring to FIGURE 4, a flow chart of a typical process in accordance with the invention is shown. From the chart it is seen that the first step is two-fold and comprises constructing a peripheral form and the membrane of canvas or other flexible material. The configuration of both the form and the membrane will be determined by the final shape of the structure desired. In the case of a structure as shown in FIGURES 1 and 3, the peripheral form is merely a circular rim on elevating legs and the membrane is hemispherical.

The next step is to hang the membrane on the form to depend therefrom in a configuration which will be substantially identical to the configuration of the desired completed structure. After or, if desired, prior to hanging the canvas on the form, a parting compound is applied and may be done either by impregnating the canvas or by applying a coat of the parting compound on that surface of the canvas upon which the plastic material is to be applied.

With the impregnated or coated canvas hanging on the form, fiberglass and resin may be applied and allowed to season whereby the basic structure is formed. As seen in the flow chart, the next step is to release the membrane and seasoned basic structure from the form and to erect it. In the case of structure shown in FIGURE 1 the erection will comprise inverting the seasoned structure to the position shown in FIGURE 3. In other cases inverting may not be necessary since the structure may be formed in its desired position.

After erecting the structure, or in some instances before erecting the structure, but in any case after the plastic material has seasoned, the canvas is stripped from the structure and the structure may be finished. Finishing may entail strengthening structurally weak areas or making cut outs, such as the cut outs 13 in FIGURE 1. In other cases the cut outs may be windows, doors, or the like.

Thus, it is seen that a new method of forming thin wall structures has been provided wherein structures having infinite design variety may be constructed. The new method of forming thin wall structures may be employed in a design of substantially any type of small building with a variety of rigid-setting plastic materials such as fiberglass and resins or even with Portland cement. In some instances, especially in building larger structures, a fiberglass and resin structure may be constructed and employed as a form for a Portland concrete structure. Certain plastics may be used as a form for concrete and left as a permanent part of the structure after the concrete has seasoned.

I claim:

1. The method of forming a thinwall structure which comprises, constructing an elevated form, contouring the periphery of the form to predetermine the shape of said structure, constructing a shaped flexible membrane, securing said membrane at its periphery to the contoured portions of the form in a depending manner, said contoured periphery being the sole support for said membrane so that the shape of the structure is determined solely by the shape of the periphery of the form and the shape of the flexible membrane, applying a substantially rigid setting plastic material to a surface of the membrane, allowing the plastic material to season, releasing the membrane and seasoned plastic material from the form, removing the membrane from the seasoned plastic material and erecting said seasoned plastic material to form said thin wall structure.

2. The method of forming a thinwall structure which comprises, constructing an elevated form, forming a contoured rim on the periphery of the form to predetermine the peripheral shape of said structure, constructing a shaped flexible membrane, securing said membrane at its periphery to the contoured rim in a depending, upwardly concave manner, said contoured rim being the sole support for the flexible membrane so that the shape of the structure is determined solely by the shape of the periphery of the form and the shape of the flexible membrane, applying a substantially rigid setting plastic material to a surface of the membrane, allowing the plastic material to season, releasing the membrane and the seasoned plastic material from the form, erecting the seasoned plastic material and the membrane and removing the membrane to form said thinwall structure.

References Cited by the Examiner

UNITED STATES PATENTS

| 2,353,071 | 7/1944 | Pitou. | |
| 2,388,701 | 11/1945 | Neff | 25—154 XR |
| 2,616,149 | 11/1952 | Waller | 25—154 |
| 2,660,776 | 12/1953 | Miller | 264—313 |
| 2,695,256 | 11/1954 | De Ollogui et al. | |
| 2,892,239 | 6/1959 | Neff | 25—128 XR |
| 2,943,358 | 7/1960 | Hutchins et al. | 18—58 |
| 3,049,785 | 8/1962 | Chiado et al. | 264—32 |

OTHER REFERENCES

Modern Plastics article: "And Now-Pontoons of Reinforced Plastics," pp. 100, 101, and 177, vol. 38, No. 8, April 1961.

ALEXANDER H. BRODMERKEL, *Primary Examiner.*

MICHAEL V. BRINDISI, ROBERT F. WHITE, *Examiners.*